United States Patent [19]

Barber

[11] Patent Number: 4,955,651
[45] Date of Patent: Sep. 11, 1990

[54] HOOK LATCH ADAPTER

[75] Inventor: Donald E. Barber, Marathon, N.Y.

[73] Assignee: Cooper Industries, Inc., Houston, Tex.

[21] Appl. No.: 450,577

[22] Filed: Dec. 11, 1989

[51] Int. Cl.$^5$ .............................................. B66C 1/36
[52] U.S. Cl. ................................ 294/82.19; 24/599.8
[58] Field of Search ................ 294/82.17, 82.19, 82.2, 294/82.22; 24/241 R, 241 S, 241 P, 241 PP, 241 PL, 241 SP, 241, SB; 411/544, 546, 342, 343; 267/155, 275

[56] References Cited

U.S. PATENT DOCUMENTS

| | | | |
|---|---|---|---|
| 1,842,593 | 1/1932 | Edwards | 24/241 P |
| 2,527,604 | 10/1950 | Walk | 267/155 X |
| 3,126,072 | 3/1964 | Johansson | 267/155 |
| 4,039,220 | 8/1977 | Stoops | 24/241 PP X |
| 4,193,627 | 3/1980 | Cranston et al. | 294/82.19 |

OTHER PUBLICATIONS

Catalog Sheet Showing the Safe-T-Latch Manufactured by Industrial Safety & Security Co.

Primary Examiner—Margaret A. Focarino
Assistant Examiner—Dean J. Kramer
Attorney, Agent, or Firm—MacMillan, Sobanski & Todd

[57] ABSTRACT

An adapter for attaching a universal latch to a hook. The adapter consists of a spring formed into two helical end coils connected by an U-shaped intermediate section. The adapter fits over a flange on the hook with the end coils in axial alignment with a latch mounting hole through the flange. The end coils fill excess space between the flange and the latch and center the latch on the flange.

5 Claims, 2 Drawing Sheets

HOOK LATCH ADAPTER

TECHNICAL FIELD

The invention relates to hooks such as eye hoist hooks, shank hoist hooks, swivel hoist hooks and the like, and more particularly to an adapter for installing a universal swivel latch on a hook.

BACKGROUND ART

Hooks are used for many applications, such as for hoisting loads. A hook comes with either a fixed or a swivel eye or with other means for attachment to, for example, a cable or a chain. The hook is forged from a metal selected to meet application requirements, such as strength, corrosion resistance, etc. The hook is formed with a throat which is open to engage a load.

For some applications, it is desirable to provide a latch for closing the hook throat to retain the load in the hook. One common type of latch is attached to a cam or flange formed on the hook adjacent the throat opening. The flange is provided with a hole for attachment of the latch. A spring and holes in the latch are aligned with the flange hole and a bolt is secured through the aligned holes and spring. The spring urges the latch to a position closing the hook throat, while permitting the latch to be pivoted to an open position where the throat is clear for engaging or disengaging a load.

Because of the environment in which hooks are used, the latch may break or become damaged. Therefore, it is common for the hook manufacturers to provide replacement latches for hooks. However, each hook manufacturer makes hooks of its own design. There are no dimension standards for hooks purchased from different manufacturers. This is particularly true for the thickness of the flange on which a latch is mounted. Consequently, a hook latch made for one manufacturer's hooks will not necessarily fit a hook from another manufacturer.

DISCLOSURE OF INVENTION

According to the invention, an adapter is provided for attaching a universal hook latch to hooks having different dimensions for the latch mounting flange. The adapter consists of a wire spring having two helical end coils connected by a U-shaped intermediate section. The intermediate section has a width and shape for fitting over the hook flange and for holding the two end coils in axial alignment with the mounting hole in the flange. The latch spring and latch are positioned over the adapter and flange and attached with a bolt as with a conventional prior art latch. The end coils on the adapter are of the same axial dimension to center the latch on the flange. Further, the end coils on the adapter are sized to fill excess space between the flange and the latch.

Accordingly, it is an object of the invention to provide an adapter for attaching a universal latch to a flange on a hook.

Other objects and advantages of the invention will be apparent from the following detailed description of preferred embodiments of the adapter and the accompanying drawings.

BEST MODE FOR CARRYING OUT THE INVENTION

Figure 1:
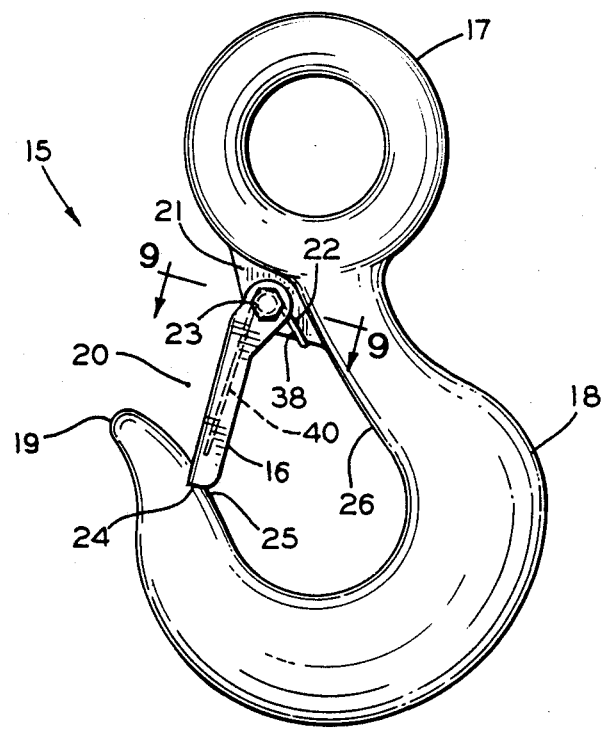
FIG. 1 is side elevational view through an eye hook with an attached latch.

Referring to the drawings and particularly to FIG. 1, an exemplary eye hook 15 is shown with an attached latch 16. The hook 15 is formed with an eye 17 for attachment, for example, to a cable or a chain (not shown). A hook section 18 depends from the eye 17 and terminates at a free end 19. The hook section 18 has a throat 20 which is closed by the latch 16. A cam or flange 21 extends from the eye 17 and the hook section 18 adjacent the throat 20 for securing the latch 16 to the hook 15.

The latch 16 and a latch spring 22 are secured to the flange 21 by a bolt 23. The latch 16 is free to swing or pivot about the axis of the bolt 23. The spring 22 urges the latch 16 to the position shown in FIG. 1 wherein a free end 24 of the latch 16 contacts a surface region 25 of the hook section 18 near the free end 19 to close the hook throat 20. However, the latch 16 may be pivoted against the force of the spring 22 to a position where the free latch end 24 abuts a surface region 26 on the hook section 18 to open the throat 20 for engaging or disengaging a load (not shown) on the hook 15.

Figure 2:
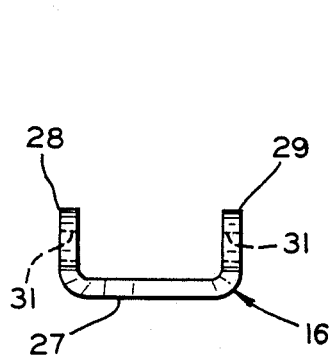
FIG. 2 is an enlarged end view of the latch from FIG. 1.
Figure 3:
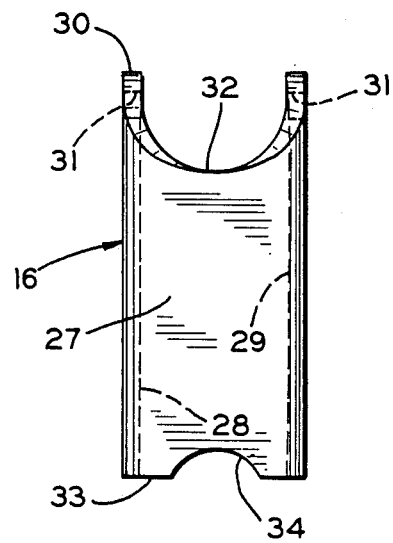
FIG. 3 is a top view of the latch of FIG. 2.
Figure 4:
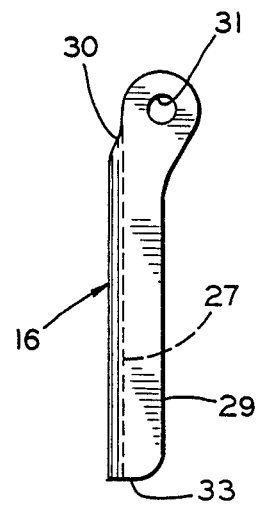
FIG. 4 is a side view of the latch of FIG. 2.

FIGS. 2–4 show details for an exemplary latch 16. The latch 16 is a generally U-shaped channel having a top web 27 and two spaced sides 28 and 29. At one end 30, the sides 28 and 29 have aligned openings 31 for passing the bolt 23 (FIG. 1) and the web 27 has a relieved area 32 for clearing the flange 21 as the latch 16 is pivoted. At an opposite end 33, the web 27 may be provided with a curve 34 for confirming to the hook surface region 25.

Figure 5:
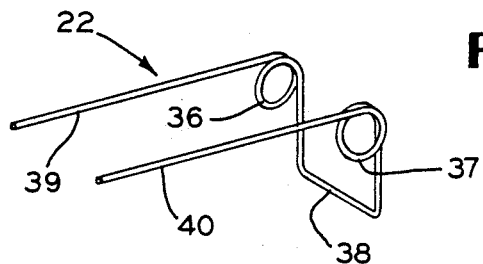
FIG. 5 is an enlarged perspective view of a latch closure spring.

The latch spring 22 is shown in detail in FIG. 5. The spring 22 is formed from a wire bent into two loops 36 and 37. The loops 36 and 37 are connected together by a U-shaped bend 38 which holds the loops 36 and 37 spaced apart, parallel and in axial alignment for passing the bolt 23. A leg 39 extends from the loop 36 and a leg 40 extends from the loop 37. The loops 36 and 37 are spaced apart slightly less than the spacing between the latch sides 28 and 29. When the latch 16 is attached to the hook flange 21, the loops 36 and 37 are located on opposite sides of the flange 21 and the bolt 23 extends through the loops 36 and 37. As will be seen in FIG. 1, the U-shaped bend 38 pressed against the flange 21 and the legs 39 and 40 press against the latch web 27 to urge the latch 16 to the closed position.

In the past, the latch 16 has been designed for a hook having specific dimensions for the flange 21. The loops 36 and 37 on the spring 22 were spaced apart to just fit over the flange 21 and the sides 28 and 29 on the latch 16 were spaced to just fit over the spring loops 36 and 37. This construction centered the latch 16 on the flange 21 and prevented the latch from significant sideways movement on the flange 21. However, it also meant that a latch 16 designed for a hook having a flange with a predetermined thickness could not be used on a hook with a flange having a different thickness. If the latch was too wide for the hook flange it had excessive sideways movement relative to the flange.

Figure 6:
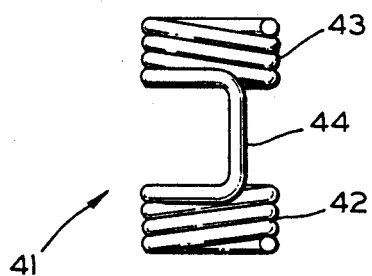
FIG. 6 is a side view of a hook latch adapter according to one embodiment of the invention.
Figure 7:
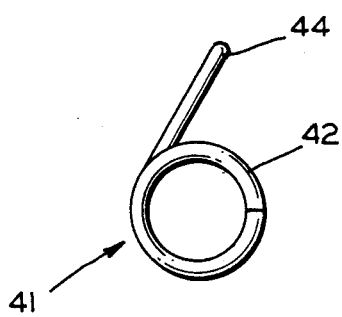
FIG. 7 is an end view of the adapter of FIG. 6.

According to the invention, a latch 16 is designed to fit hooks having latch mounting flanges with different thicknesses. The latch 16 is formed with its sides 28 and 29 spaced and the spring 22 is formed with the loops 36 and 37 spaced to accommodate the thickest hook flange 21. When the latch 16 is used with a hook having a thinner flange 21, the excess space between the hook flange 21 and the latch sides 28 and 29 is filled with an adapter 41, as shown in FIGS. 6 and 7. Preferably, the adapter 41 is wound from wire and includes two helical windings 42 and 43 connected by a generally U-shaped loop 44. The loop 44 holds the windings 42 and 43 spaced apart and in axial alignment. The spacing between the windings 42 and 43 is substantially the same as the flange thickness for a hook on which the adapter 41 is to be used to mount the latch 16. By "substantially the same as the flange thickness", it is to be understood that the winding spacing may be slightly less than the flange thickness provided the resiliency of the loop 44 permits pushing the adapter 41 on the flange, or it may be the same as the flange thickness, or it may be slightly greater than the flange thickness provided it does not permit excessive sideways movement of the latch 16 on the flange 21. The windings 42 and 43 are formed with an inside diameter sufficient to pass the bolt 23 or other fastener attaching the latch 16 to the hook 15. Preferably, the windings 42 and 43 have substantially the same axial length for centering the latch 16 on the hook flange 21.

Figure 8:
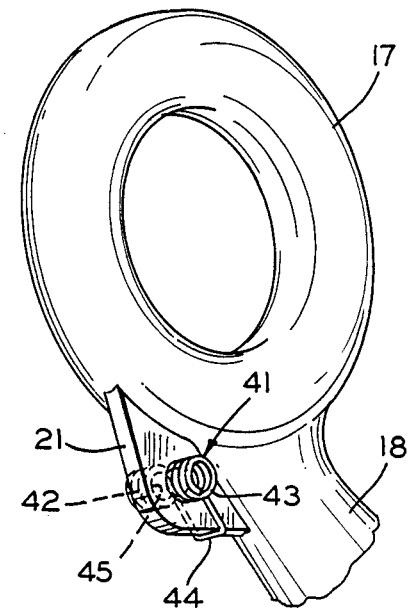
FIG. 8 is an enlarged fragmentary perspective view showing the adapter positioned on a hook flange.

FIG. 8 shows the adapter 41 positioned over the hook flange 21. The windings 42 and 43 are positioned on opposite sides of the flange 21 in alignment with a latch mounting hole 45 through the flange 21. The loop 44 wraps around the flange 21 to connect the windings 42 and 43. By connecting the windings 42 and 43 together, the latch is more easily mounted on the flange than if separate spacers were used to center the latch 16 on the flange 21.

Figure 9:
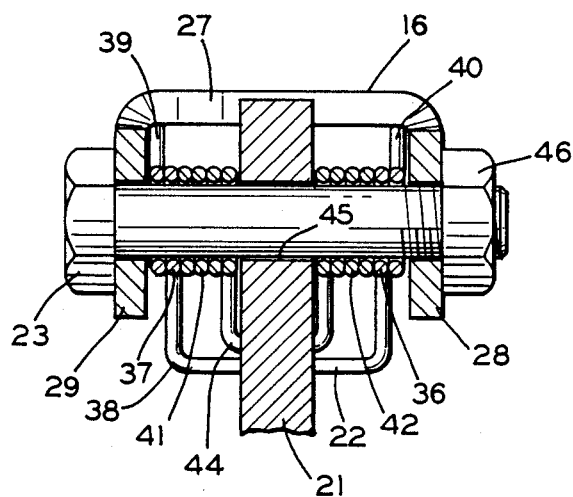
FIG. 9 is an enlarged fragmentary cross sectional view as taken along line 9—9 of FIG. 1 and showing a latch attached to a hook with the adapter of FIG. 6.

FIG. 9 is a fragmentary cross sectional view showing the latch 16 mounted on the hook flange 21 with the adapter 41. The bolts 23 extends sequentially through the latch side 28, the spring loop 36, the adapter winding 42, the flange hole 45, the adapter winding 41, the spring loop 37 and the latch side 29. A self locking nut 46 secures the bolt 23 on the latch 16. It should be appreciated that although the adapter winding 41 is shown positioned between the spring loop 37 and the flange 21 and the adapter winding 42 is shown positioned between the spring loop 36 and the flange 21, the windings 41 and 42 may extend between the latch sides 29 and 28 and the flange 21, respectively. In that case, the spring loop 37 would be positioned coaxially over the winding 41 and the spring loop 36 would be positioned coaxially over the winding 42. In either case, the windings 41 and 42 are spacers sized to take up excess space between the latch sides 28 and 29 and the flange 21 and to center the latch 16 on the flange 21.

Figure 10:
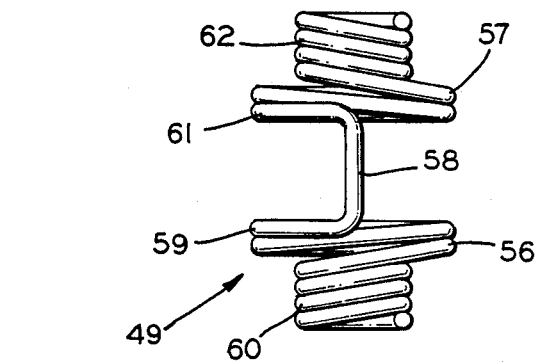
FIG. 10 is a side view of a modified embodiment of the hook latch adapter of the invention.
Figure 11:
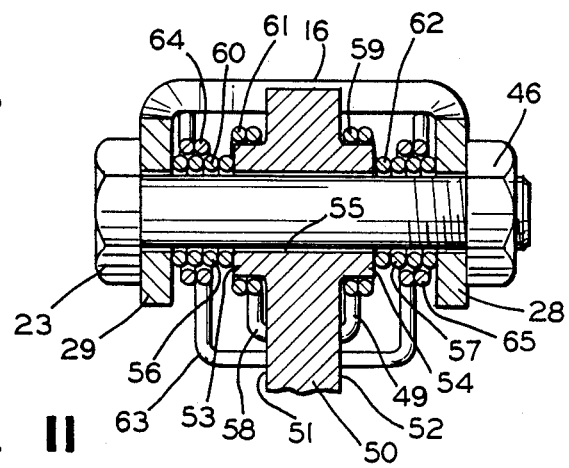
FIG. 11 is a fragmentary cross sectional view, similar to FIG. 9, but showing a latch attached to a hook with the modified adapter of FIG. 10.

FIG. 10 shows a modified adapter 49 suitable for use with a modified hook flange 50 as shown in FIG. 11. The flange 50 has a predetermined thickness between two sides 51 and 52. A nipple 53 extends from the side 51 and a nipple 54 extends from the side 52. A latch mounting hole 55 extends between the sides 51 and 52 coaxially through the nipples 53 and 54. The adapter 49 is wound from a wire and has a helical winding 56 and a helical winding 57 connected by a U-shaped loop 58. The loop 58 supports the windings 56 and 57 in axial alignment and spaced apart by substantially the thickness of the flange 50. The winding 56 has a large diameter portion 59 adapted to fit over the nipple 53 connected to a smaller diameter portion 60 adapted to fit between the nipple 53 the side 29 of the latch 16. Similarly, the winding 57 has a large diameter portion 61 adapted to fit over the nipple 54 connected to a smaller diameter portion 62 adapted to fit between the nipple 54 and a side 28 of the latch 16. FIG. 11 shows a latch spring 63 having a loop 64 of a diameter for fitting coaxially over the adapter winding 60 adjacent the latch side 29 and a loop 65 of a diameter for fitting coaxially over the adapter winding 62 adjacent the latch side 28. Whether the spring loops fit over the adapter windings as in FIG. 11 or between the adapter windings and the latch sides as in FIG. 9, the adapter windings 56 and 57 are sized to take up excess space between the latch sides 28 and 29 and the flange 21 or 50 and to center the latch 16 on the flange.

In the broadest aspect of the invention, the windings 42 and 43 on the adapter 41 can be replaced with spacer tubes secured to and connected by the U-shaped wire loop 44. However, the preferred embodiment of the invention uses a single wire formed into the adapter. The number of turns forming each winding on the adapter can be varied to accommodate different dimensions for the latch and the hook flange. It should be appreciated that a single latch may be sold in a kit with several different dimensioned adapters to permit use of the latch with several different hooks from different manufacturers. It also will be appreciated that various other modifications and changes may be made to the adapters 41 and 49 without departing from the spirit and the scope of the following claims.

I claim:

1. For a hook having a throat and a flange adjacent said throat, said flange having a predetermined thickness and a hole therethrough for mounting a latch, a latch having two sides, said sides having aligned holes and having a predetermined spacing greater than said predetermined thickness, a latch return spring, and fastening means extending through said side holes and said flange hole for securing said latch and said return spring on said flange with said latch sides located on opposite sides of said flange, a hook latch adapter comprising first and second spacers, said spacers defining holes for passing said fastener means, and a generally U-shaped wire loop connecting said spacers together with said spacer holes aligned and said spacers axially spaced apart by substantially the predetermined thickness, said spacers when positioned on opposite sides of a hook flange with said spacer holes aligned with the flange hole having a maximum axial dimension no greater than the predetermined latch side spacing.

2. A hook latch adapter, as set forth in claim 1, wherein said spacers are in the form of helical wire windings integrally formed with said U-shaped loop.

3. A hook latch adapter, as set forth in claim 2, wherein said helical windings are shaped to conform with the surface of a hook flange.

4. A hook latch adapter, as set forth in claim 2, wherein said adapter has a maximum axial dimension substantially equal to the predetermined latch side spacing.

5. A hook latch adapter, as set forth in claim 2, wherein said two helical wire windings have substantially the same axial length for centering the latch on the hook flange.

* * * * *